United States Patent
Williams (10) Patent No.: US 10,910,935 B2
(45) Date of Patent: Feb. 2, 2021

(54) ELECTROMAGNETIC LINEAR ACTUATOR

(71) Applicant: TRW Limited, Solihull (GB)

(72) Inventor: Connel Brett Williams, Leamington Spa (GB)

(73) Assignee: ZF Automotive UK Limited, Solihull ( * ) Notice: Subject to any disclaimer, the term of this patent is extended or adjusted under 35 U.S.C. 154(b) by 5 days.

(21) Appl. No.: 16/527,325

(22) Filed: Jul. 31, 2019

(65) Prior Publication Data

US 2020/0044549 A1  Feb. 6, 2020

(30) Foreign Application Priority Data

Jul. 31, 2018 (GB) .................................. 1812485.9

(51) Int. Cl.
*H02K 41/03* (2006.01)
*H02K 41/035* (2006.01)

(52) U.S. Cl.
CPC .............................. *H02K 41/0356* (2013.01)

(58) Field of Classification Search
CPC ...... H02K 41/031; H02K 33/00; H02K 33/16; H02K 33/12; H02K 41/02; H02K 1/34; H02K 33/18
(Continued)

(56) References Cited

U.S. PATENT DOCUMENTS 4,766,358 A * 8/1988 Higuchi ................. H02K 41/03
 104/281
7,501,723 B2 * 3/2009 Yasuda ..................... H02K 7/06
 310/12.04
(Continued)

FOREIGN PATENT DOCUMENTS

CN  203911720 U  10/2014
CN  104242596 A  12/2014
(Continued)

OTHER PUBLICATIONS

Patents Act 1977: Search Report under Section 17(5), Application No. GB1812485.9, dated Jan. 17, 2019.

*Primary Examiner* — Thanh Lam
(74) *Attorney, Agent, or Firm* — Gigette M. Bejin (57) ABSTRACT

A linear actuator comprising a first fixed portion comprising a linear array of stator teeth, each surrounded by one or more turns of electrical wire, a controller which generates a set of currents that are applied to phase windings of the first fixed portion to generate a pattern of magnetic poles along the array of stator teeth, a spacing between the magnetic poles being larger than a spacing between adjacent stator teeth of the first fixed portion, a second fixed portion that comprises an alternating set of magnet poles, a spacing between adjacent poles being smaller than the spacing of the magnetic poles of the first fixed portion created by the controller, and a movable output portion that comprises a linear array of pole pieces that extend along a length of the moveable output portion that is greater than a stroke length of the actuator and longer than a length of the fixed portion, whereby in use a length of the movable output portion is at all times located between the first and second fixed portions, in which the pole pieces that are located between the first and second fixed portions shape a magnetic flux acting between the magnetic poles of the first fixed portion and the magnet poles of the second fixed portion, and whereby in use the controller is arranged to cause linear movement of the moveable output portion by moving the magnetic poles of the first fixed portion along the first array.

11 Claims, 7 Drawing Sheets

(58) Field of Classification Search
USPC ....... 310/12.25–12.19, 12.21–24, 13–15, 22, 310/23
See application file for complete search history.

(56) References Cited

U.S. PATENT DOCUMENTS

| | | | | |
|---|---|---|---|---|
| 7,786,631 | B2* | 8/2010 | Sasaki | H02K 41/03 310/68 B |
| 2008/0100151 | A1* | 5/2008 | Takeuchi | H02K 41/03 310/12.14 |
| 2015/0015090 | A1* | 1/2015 | Satou | H02K 41/031 310/15 |

FOREIGN PATENT DOCUMENTS

| | | |
|---|---|---|
| CN | 107086754 A | 8/2017 |
| WO | 2018167970 A1 | 9/2018 |

\* cited by examiner

ELECTROMAGNETIC LINEAR ACTUATOR

CROSS-REFERENCE TO RELATED APPLICATIONS

This application is a national stage of Great Britain Patent Application No. 1812485.9, filed 31 Jul. 2018, the disclosures of which are incorporated herein by reference in entirety.

BACKGROUND TO THE INVENTION

This invention relates to linear actuators and in particular an electromagnetic linear actuator suitable for applications requiring a high stroke length along a line.

A linear actuator is a device that generates motion of an output member, typically an elongate rod, along a straight or curved line. A wide variety of types of linear actuators are known. One of the earliest types of linear actuator is the screw drive in which a threaded rod is engaged with a threaded body that can be rotated to cause the threaded rod to move along a linear path. Devices incorporating these types of linear actuator are widely used in car jacks, because the rotation of the fixed part can be provided through human effort. In another class of linear actuator, hydraulic pressure in a cylinder can be used to drive a piston along a linear path.

Another type of linear actuator is the linear motor. These function in a similar manner to a conventional electric motor but have the stator and a part that is functionally equivalent to the rotor arranged in a line rather than wrapped around an axis. The output is therefore a translational rather than a rotary movement. A simple linear motor has a set of windings on a fixed part that create a flux that interacts with a flux pattern produced by a set of magnets mounted on an elongate moving part. By moving the pattern of flux along the stator, Lorenz forces will cause the linear member to move along a linear path as the flux patterns from the permanent magnets attempt to align themselves with the pattern of flux generated by the stator.

The applicant has appreciated that known linear motors that use permanent magnets on the moving part, whilst able to produce highly accurate linear motion, can be prohibitively expensive where there is a desire to produce a linear actuator with a high stroke length and that can generate high linear forces. To generate a high force, the magnets arranged along the moving member must be able to produce a high level of flux. Magnets that are able produce high levels of flux are relatively expensive including rare earth elements in their composition. Also, because the magnets must be spaced along the full length of the member this would require the use of a large number of magnets on the moving member for a high stroke length. This is rather wasteful as only the magnets that are aligned with the stator are actually doing any work at any given time, the rest are simply being carried along as the output part moves.

SUMMARY OF THE INVENTION

A feature of the invention is to provide a linear actuator that ameliorates some of the limits of prior art linear actuator designs.

According to a first aspect the invention provides a linear actuator assembly comprising:

a first fixed portion comprising a linear array of stator teeth, each surrounded by one or more turns of electrical wire, a controller which generates a set of currents that are applied to the phase windings of the first fixed portion to generate a pattern of magnetic poles along the array of teeth, the spacing between the poles being larger than the spacing between adjacent teeth of the first fixed portion, a second fixed portion that comprises an alternating set of magnet poles, the spacing between adjacent poles being smaller than the spacing of the magnetic poles of the first array created by the controller, and a movable output portion that comprises a linear array of pole pieces that extend along a length of the output part that is greater than the stroke length of the actuator and longer than the length of the fixed portions, whereby in use a length of the movable output portion is at all times located between the first and second fixed portions, in which the pole pieces that are located between the fixed portions shape the magnetic flux acting between the poles of the first fixed portion and the poles of the second fixed portion, and whereby in use the controller is arranged to cause linear movement of the output portion by moving the magnetic poles of the first fixed portion along the array.

By this invention, the controller produces a moving flux pattern at the first stator that interacts with a similar moving pattern of flux from the second fixed portion that has been shaped by the pole pieces of the output portion. The speed of the movement of the poles of the shaped flux pattern will be lower than the speed of movement of the poles of the first fixed portion but in the same direction, which provides a degree of gearing to the actuator giving a high force density. Because the movable array only includes relatively low cost pole pieces, rather than fixed magnets as is known in the prior art, a cost effective linear actuator can be produced using only pole pieces spaced along the output rather than magnets.

The first fixed portion may define two magnetic poles, the second fixed portion may define more than two magnetic poles, and the pole pieces may shape the flux from the poles of the second magnetic poles to generate two magnetic poles in the region where the flux from the first fixed portion meets the flux from the second fixed portion.

In one workable arrangement, the second fixed portion may comprise 21 magnetic poles generated by 21 magnets, and the output part may carry 12 pole pieces along a portion of the output part that is located between the two fixed portions for all positions of the output part along its stroke, with the first fixed part generating two pole pairs, each comprising a pair of North or a pair of South poles.

The output part in the workable example will therefore be required to have many more than 12 pole pieces along its length.

Other numbers of magnetic poles and pole pieces may be used, with the aim being for the pole pieces to couple a strong, ideally first, harmonic of the magnetic flux from the second fixed portion to a matching pattern of pole generated by the windings and teeth of the first fixed portion.

The pole pieces of the output part may comprise ferrous metallic pole pieces, most preferably steel pole pieces. They may be supported by a non-ferrous carrier. For instance, they may be fixed onto or buried within a carrier. The pole pieces do not need to be magnets, unlike prior art linear actuators, because their function is solely to shape the magnetic flux from the second fixed portion in the airgap between the two fixed portions.

The fixed portions may be fixed in a frame of reference with the movable array translating relative to that frame along a stroke length. The fixed frame of reference may be fixed relative to the earth, or fixed relative to the body of a vehicle that carries the linear actuator. It may be fixed, for example, relative to the frame of reference of a platform onto which the linear actuator is secured. A fixing means such as a stand or support may be provided for fixing the fixed portion in position, for example for fixing them to the body of a vehicle or other fixed part of a vehicle. The fixing means may comprise openings for receiving fasteners such as bolts. The fixing means may include a base plate that is secured to or integral with the first and or second fixed portions.

The output portion may comprise an elongate member having a constant cross section along a major part of its length which may pass between the fixed portions. This may be square, rectangular or circular cross section, although it could conceivably be of any cross section.

The output member may have a length of at least 30 cm, or at least 1 m or more. In theory there is no limit on the stroke of the linear actuator although in practice the limit will be dependent on frictional forces and, if the output part is moving vertically, the weight of the output part. Because only low cost pole pieces are needed, compared with magnets, a linear actuator with a high stroke length can be achieved in a cost effective manner.

The second fixed portion may comprise a linear array of permanent magnets, each magnet defining one pole of the second fixed portion. The magnets may be arranged in an alternating North-South pattern to create alternating North and South magnetic poles in the air gap between the second fixed portion and the output member.

In an alternative, the second fixed portion may comprise a linear array of electromagnets. Each electro magnet may comprise a tooth around which is wound a length of conductive wire forming a coil. The coils may be supplied with a current from a controller which generates a fixed non-moving pattern of flux defining the poles of the second fixed portion.

A single controller may drive the windings of both the first fixed portion and the second fixed portion, although of course different patterns of current will be applied to the coils of each fixed portion as one requires a moving DC field and the other a fixed DC field.

The use of electromagnets to generate the poles of the second fixed portion may be preferable where costs are to be minimized but with a trade off in electrical efficiency of the linear actuator due to Ohmic losses and potentially an increase in weight.

The applicant has appreciated that the arrangement described above with first and second fixed portions and an output part between them will generate some lateral forces on the output part.

The output part may therefore be supported at spaced locations along its length by one or more bearing assemblies which resist lateral forces.

In an alternative arrangement, which may be combined with the use of bearings if desired, the linear actuator may further comprise:

a third fixed portion comprising a linear array of stator teeth, each surrounded by one or more turns of electrical wire, the controller generating a set of currents that are applied to the phase windings of the third fixed portion to generate the same alternating pattern of magnetic poles along the array of teeth as for the first fixed portion, and a second movable output portion that comprises a linear array of pole pieces, at least part of the movable output portion being located between the second fixed portion and the third fixed portion.

The number and position of the pole pieces match the number and position of the pole pieces of the first movable output portion and shape the magnetic flux acting between the poles of the third fixed portion and the poles of the third fixed portion.

This arrangement places the second fixed part in the middle of a sandwich construction with one moving portion on each side, and the first fixed portion and third fixed portion forming the outermost layer of the sandwich.

The two movable output portions may be mechanically connected or may be formed from a single unitary member. There may for example, be an elongate member with an elongate slit along its length that receives the second fixed member, the two sets of pole pieces extending along opposing sides of the slit.

All of the fixed portions and moving portions may lie in a single plane which each array being rectilinear.

Alternatively, each of the fixed portions and moving portions may be axisymmetric having a cylindrical or part cylindrical cross section along their length.

According to a second aspect the invention provides a linear actuator for use with a controller to form a linear actuator assembly according to the first aspect of the invention, the actuator body comprising:

a first fixed portion comprising a linear array of stator teeth, each surrounded by one or more turns of electrical wire, a second fixed portion that comprises an alternating set of magnet poles, and a movable output portion that comprises a linear array of pole pieces that extend along a length of the output part that is greater than the stroke length of the actuator and longer than the length of the fixed portions, whereby in use a length of the movable output portion is at all times located between the first and second fixed portions, in which the pole pieces that are located between the fixed portions shape the magnetic flux acting between the poles of the first fixed portion and the poles of the second fixed portion.

Other advantages of this invention will become apparent to those skilled in the art from the following detailed description of the preferred embodiments, when read in light of the accompanying drawings.

BRIEF DESCRIPTION OF THE DRAWINGS

FIG. 6(a) shows the teeth and windings of the first fixed part, or third fixed part where present, of the actuators of FIGS. 1 to 5, (b) shows the flux pattern generated corresponding to two poles when currents are applied to the windings using a first set of current waveforms; and (c) shows the movement of the pattern of two poles along the array of teeth when a different set of current waveforms is applied;

FIG. 7(a) shows the arrangement of permanent magnets of the second fixed portion of the linear actuator of FIG. 1 with the output part and the first fixed portion not present, (b) shows the effect of the output part modifying the flux, again with the first fixed part not present, and (c) shows the same modified flux pattern moved along the array due to a different alignment of the output part with the second fixed portion where the output part has moved to the right by a distance equal to the spacing between adjacent pole pieces.

DETAILED DESCRIPTION OF THE INVENTION

Figure 1:
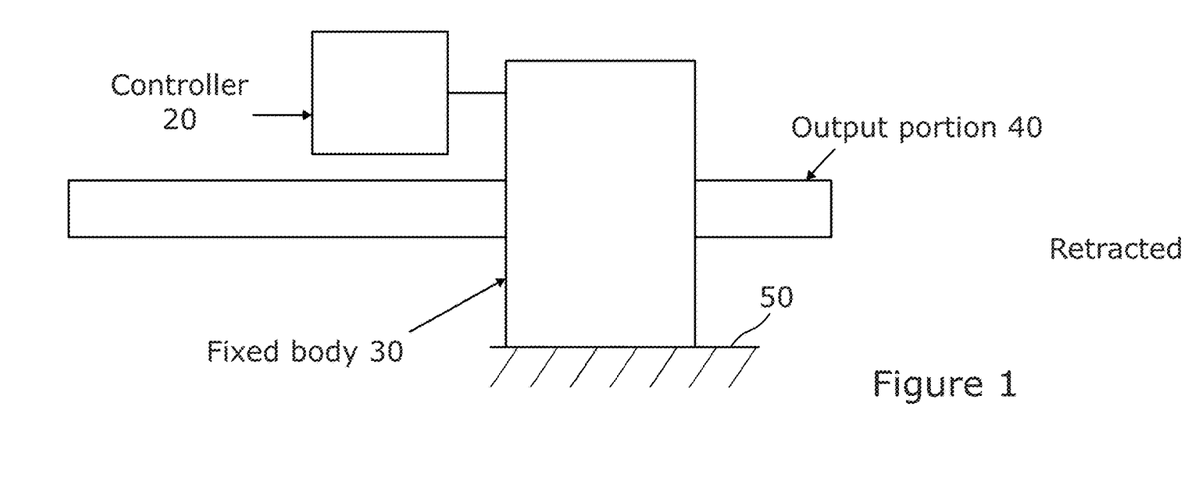
FIG. 1 is a plan view of a first embodiment of a linear actuator in accordance with the present invention with the output part in a retracted position towards one end of the actuator stroke.
Figure 2:
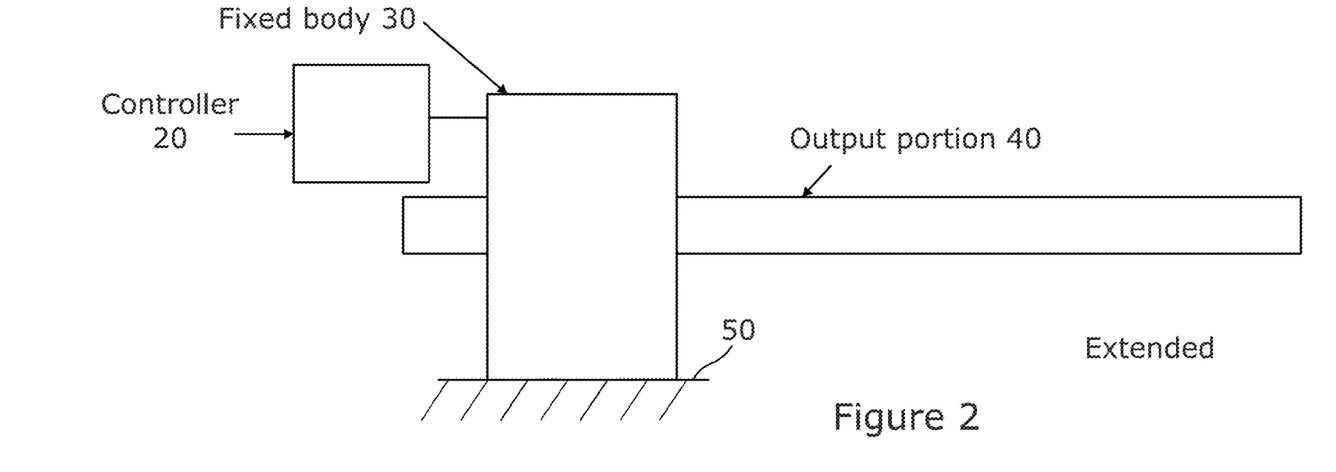
FIG. 2 is a plan view corresponding to FIG. 1 showing the linear actuator with the output part in a fully extended position towards the opposite end of the actuator stroke.

A linear actuator in accordance with an aspect of the present invention comprises an actuator having a fixed body 30 and a moving output portion 40. The fixed body part is secured to a platform 50 or other support and in use is not intended to move. The moving output portion 40 performs the work, and in use moves linearly to and fro along path from a retracted position as shown in FIG. 1 to a retracted position as shown in FIG. 2. The actuator comprises an arrangement of ferrous poles and electromagnets. The movement is generated by Lorenz forces acting between the fixed body 30 and the moving output portion 40, and is controlled by a controller 20 which controls the flow of current through windings of the electromagnets in the fixed body portion 30 in a manner that will be described herein below.

Figure 3:
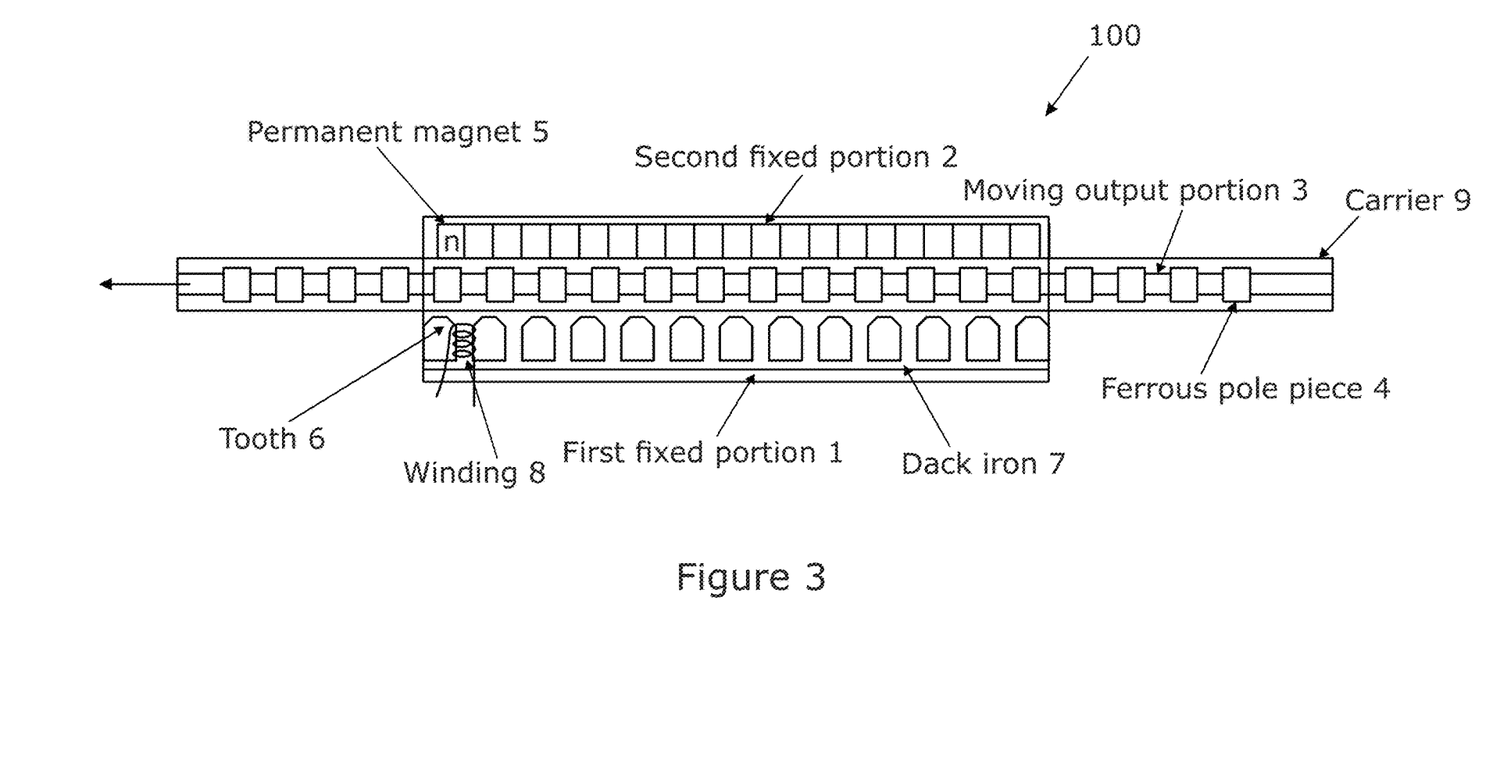
FIG. 3 is a schematic view of the main components of the actuator body that forms a part of the linear actuator of FIG. 1.

The linear actuator may be arranged in a variety of manners and a first embodiment 100 is illustrated in FIG. 3 of the accompanying drawings. In this embodiment the actuator 100 comprises two fixed elongate portions 1, 2 arranged in parallel and facing each other across an air gap. A moving output portion 3 is located in the air gap and comprises an elongate rod. The rod has a length along its long axis which is greater than the length of the air gap, so that for any position along its stroke a part of the rod but not the entire rod is located in the air gap. Bearing assemblies, not shown, may be provided to support the rod laterally to ensure it remains central in the air gap between the two fixed elongate portions.

A first one of the elongate fixed portions 1 comprises a linear array of stator teeth 6 that extend from a continuous back iron 7 that extends from one end of the fixed portion to the other. In this example there are 12 teeth spaced equally along the back iron. Each tooth 6 is surrounded by one or more turns of electrical wire that form one winding 8 of a set of coil windings. The windings are configured in phases, and the windings are connected to the output of a controller.

Figure 6:
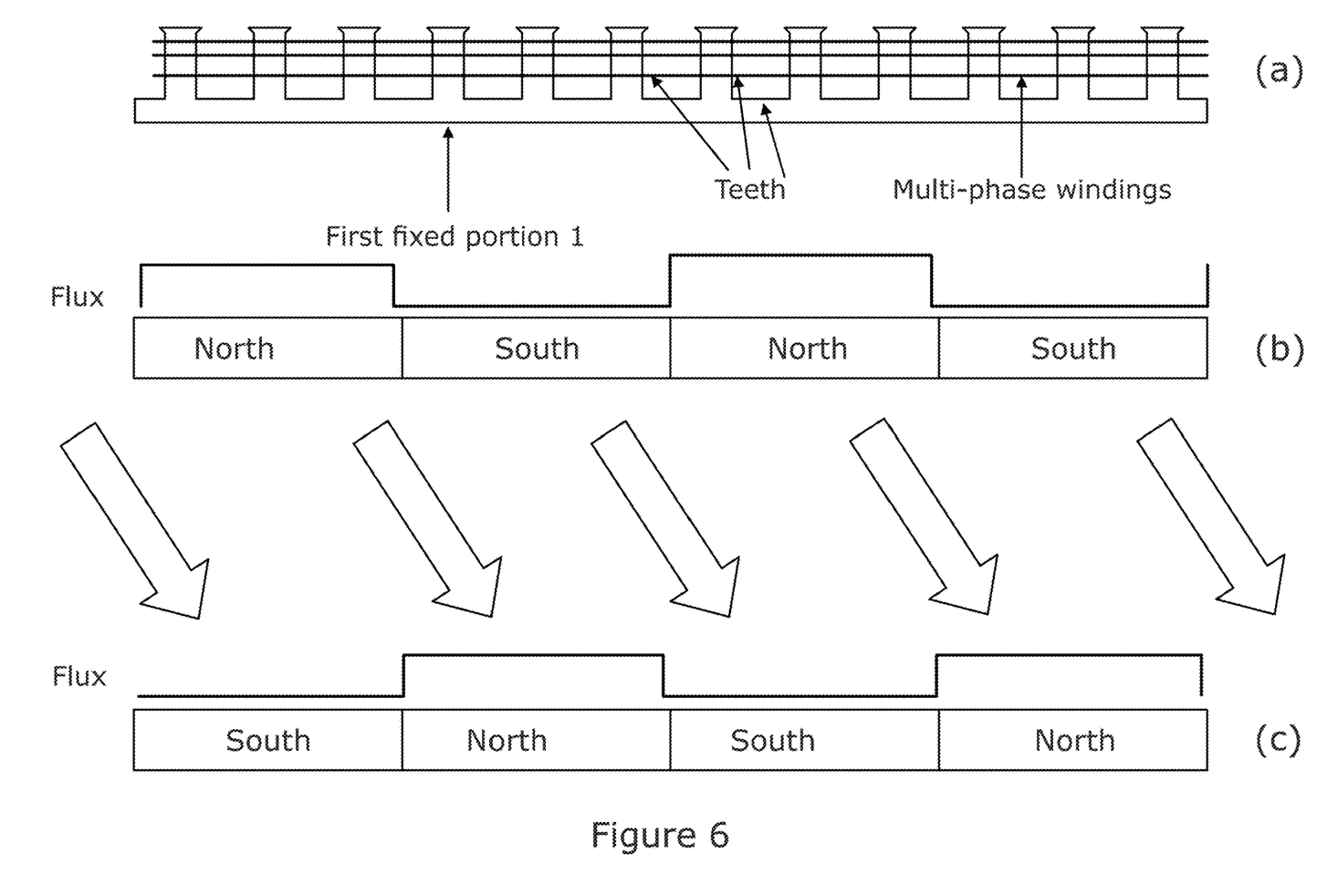

The controller generates a set of phase currents that are applied to the windings 8 of the first fixed portion 1 to generate a pattern of magnetic poles along the array of teeth. In this example, current waveforms are applied that generate a pattern with two pairs of poles—two North and two South poles, with equal spaces between them. The number of poles is therefore less than the number of teeth. Importantly, the pattern of poles can be moved along the first fixed portion by changing the currents applied to the windings. FIGS. 6(a) to (c) show how the pattern of poles can be moved along the array of teeth simply by varying the currents applied to the windings. As can be seen, the spacing between the two poles does not vary, simply that the pattern moves along the first fixed portion 1.

The second elongate fixed portion 2 comprises an elongate array of permanent magnet poles 5, alternating between North and South poles along the length of the fixed portion 2. These are supported by an elongate back piece. The spacing between adjacent poles is smaller than the spacing of the magnetic poles of the first array created by the controller, and in this example there are 21 magnets spaced equally along the second elongate fixed portion. The first and second fixed portions have the same length in this example.

The movable output portion 3 comprises an elongate non-ferrous carrier 9 which supports a linear array of pole pieces 4 that extend along the full length of the output part. For any position of the output part along its stroke 12 of the pole pieces are located in the air gap between the two fixed portions. The pole pieces 4 are spaced uniformly along the carrier. Each pole piece 4 comprises a portion of ferrous material.

Figure 7:
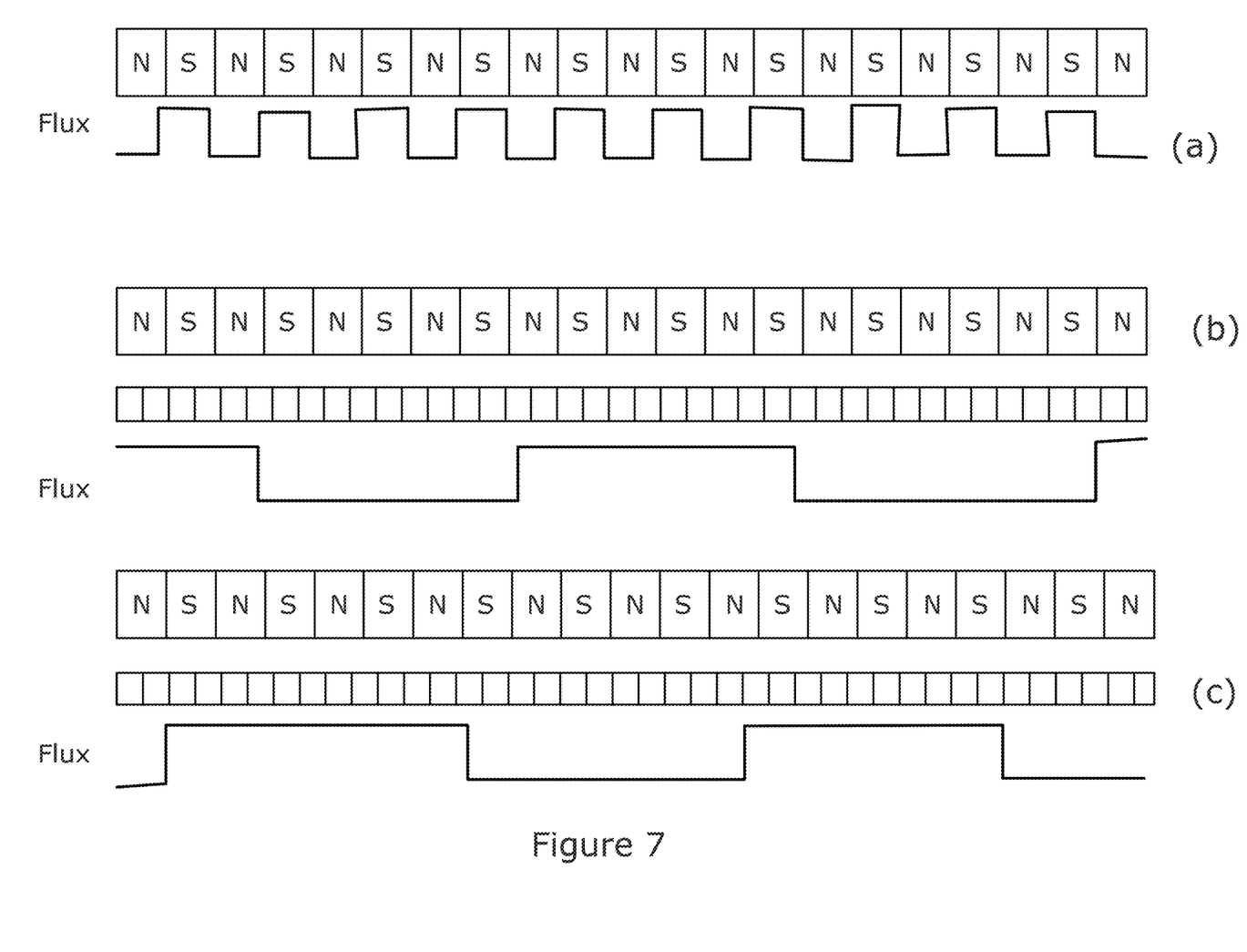

The presence of the pole pieces 4 in the air gap shapes, or distorts, the magnetic flux pattern from the magnets 5 of the second fixed portion. This can be seen in FIG. 7. Without the pole pieces the flux in the air gap from the magnets 5 of the second fixed part will be as shown in FIG. 7(a). With the output part in place, this is shaped to form a flux pattern similar to that which would be created with only two magnet pole pairs on the second fixed portion as shown in FIG. 7(b). In fact, movement of the output part by a small distance relative to the second output part will result in the same flux pattern but shifted in the direction of movement of the output part as shown in FIG. 7(c). The cause of this shaping is well understand in the context of pseudo-direct drive motors and a detailed discussion is given in International patent application WO 2007/125284 in the name of University of Sheffield where the concept is used in the design of rotary electrical machine.

The reader will appreciate that modified flux pattern from the permanent magnets 5 will interact with the similar flux pattern from the electromagnets of the first fixed part, and by moving the pole pattern of the first fixed portion Lorenz forces will act on the pole pieces 4 of the output part causing it to move to realign the flux patterns to a position in which there is no force acting on the output part. As this causes movement of the output part 3, the way in which the flux from the second fixed part changes, and this results in the output part 3 moving much at a speed which is slower than the pole pattern of the first fixed part is moved. The result is a form of magnetic gearing which is beneficial in providing high force density for the linear actuator.

Figure 4:
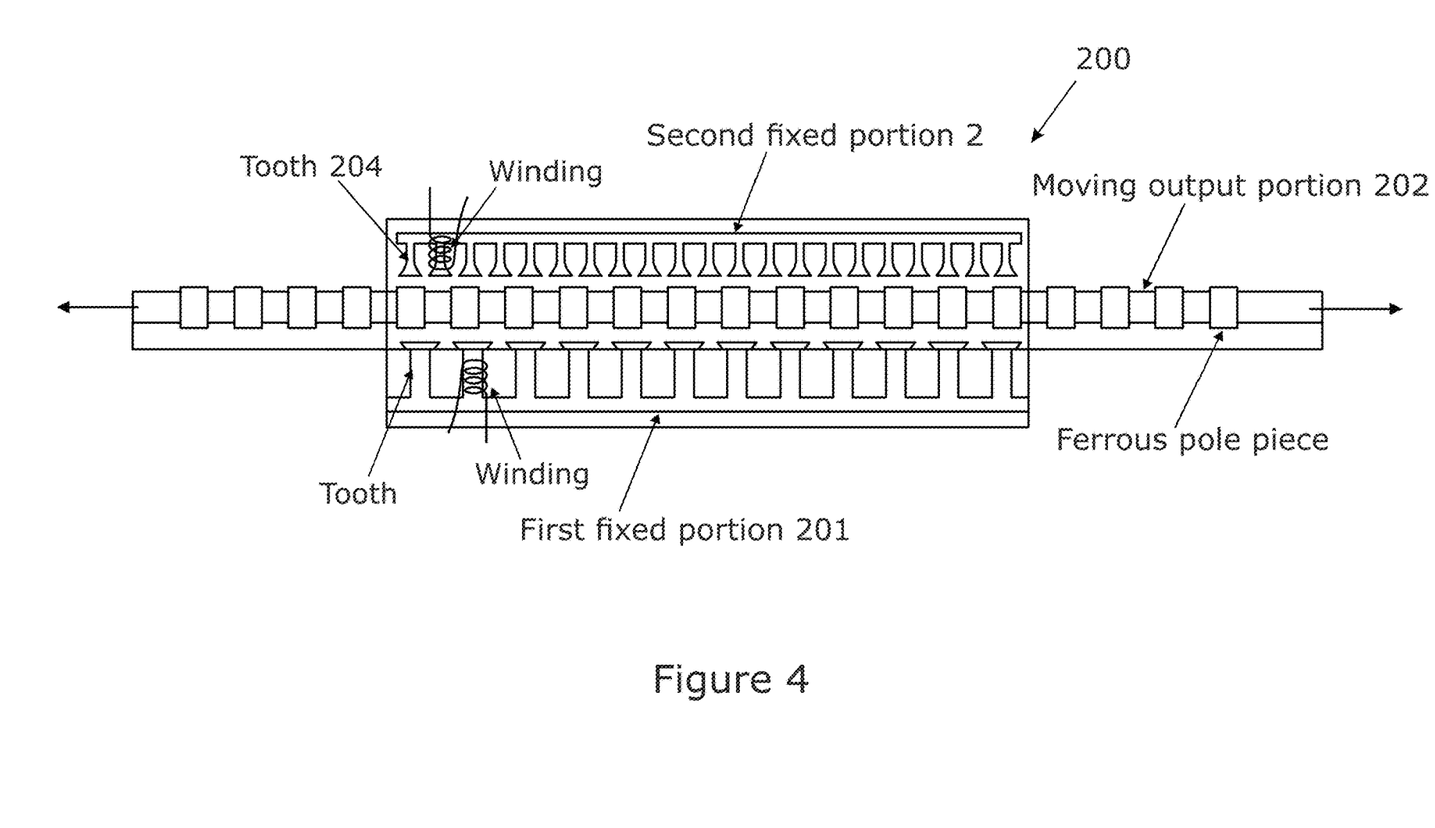
FIG. 4 is a schematic view similar to FIG. 3 of the main components of the actuator body that forms a part of a second embodiment of a linear actuator according to an aspect of the invention.

FIG. 4 is a view of a second embodiment of a linear actuator 200 in accordance with an aspect of the invention. In this arrangement a first fixed part 201 and a moving output part 202 are provided which are identical in shape and function to those parts of the first embodiment 100 of FIG. 3. Where this differs is in the arrangement of the second fixed part 203 which includes a set of electromagnets 204 instead of a set of permanent magnets. Each electromagnet comprises a tooth around which a coil of conductive wired is wound in a conventional manner. The electromagnets 204 are not modulated, but are simply driven by applying currents to the windings of each electromagnet that cause a fixed DC field to be created which is functionally identical to that generated by the permanent magnets of FIG. 3. The electromagnets, when driven, present alternating North and South poles to the moving output part 202. In a simple arrangement, every other tooth is wound in series to form a set which will provide the North poles, and every interleaved tooth is wound in series to form a second set that will form the South poles.

Figure 5:
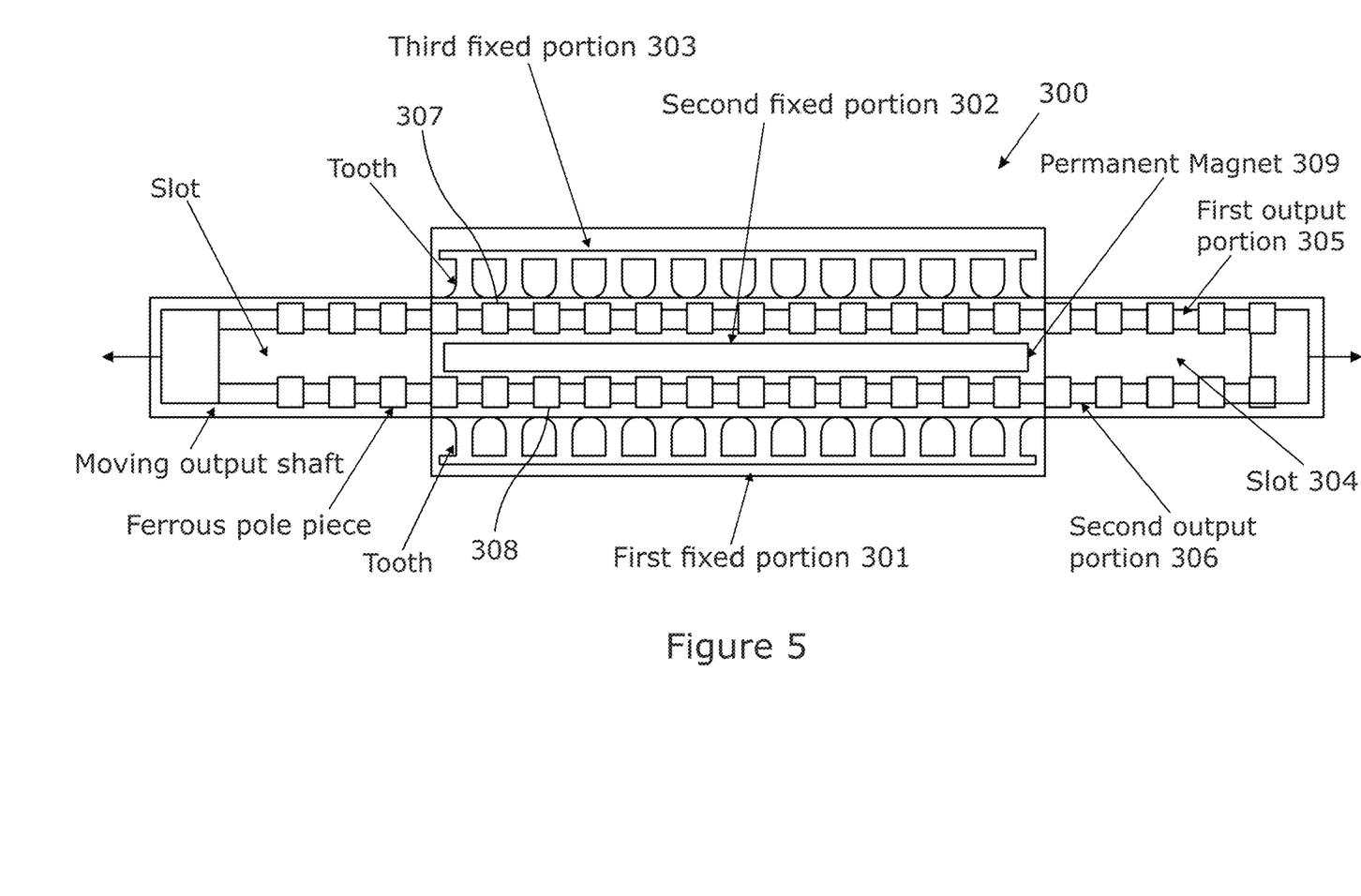
FIG. 5 is a schematic view similar to FIG. 3 of the main components of the actuator body that forms a part of a third embodiment of a linear actuator according to an aspect of the invention.

FIG. 5 is a view a third embodiment 300 of a linear actuator in accordance with an aspect of the invention. In this embodiment, the first fixed part 301 and second fixed part 302 are identical in shape and function to those of the first embodiment, but as shown there is an additional third fixed portion 303, located on the opposite side of the second fixed portion 302 to define a second air gap. The output portion is split in two along its length to define a central slot 304 that extends around the second fixed part. This second fixed part comprises an elongate support for an alternating set of North and South permanent magnet poles 309. The output part can therefore be considered to form two parallel elongate output portions 305,306. Each of the two elongate output parts carries a respective row of pole pieces 307,308, the two rows of poles pieces being arranged on each side of the slot 304, so that one set of pole pieces is located in an air gap between the first fixed portion and the second fixed portion, and another set of pole pieces is located in an identical air gap between the second fixed portion and the third fixed portion.

By making the first fixed portion 301 and third fixed portion 303 identical and applying the same current waveforms, making the air gaps identical on each side of the second fixed portion, and by making the two rows of pole pieces identical, the lateral forces that act of the output portion of the embodiments of FIGS. 3 and 4 may be eliminated. This may permit the bearing assemblies to be omitted as the balanced forces will hold the output shaft securely preventing lateral movement when in use.

Of course, the same effect can be achieved with non-identical parts by controlling the currents applied to the windings of each of the fixed parts to compensate for any variations. Also, the skilled person will appreciate that the permanent magnets of the second fixed portion could be swapped for electromagnets as demonstrated by the second embodiment without material variation of the way in which the actuator functions.

Figure 8:
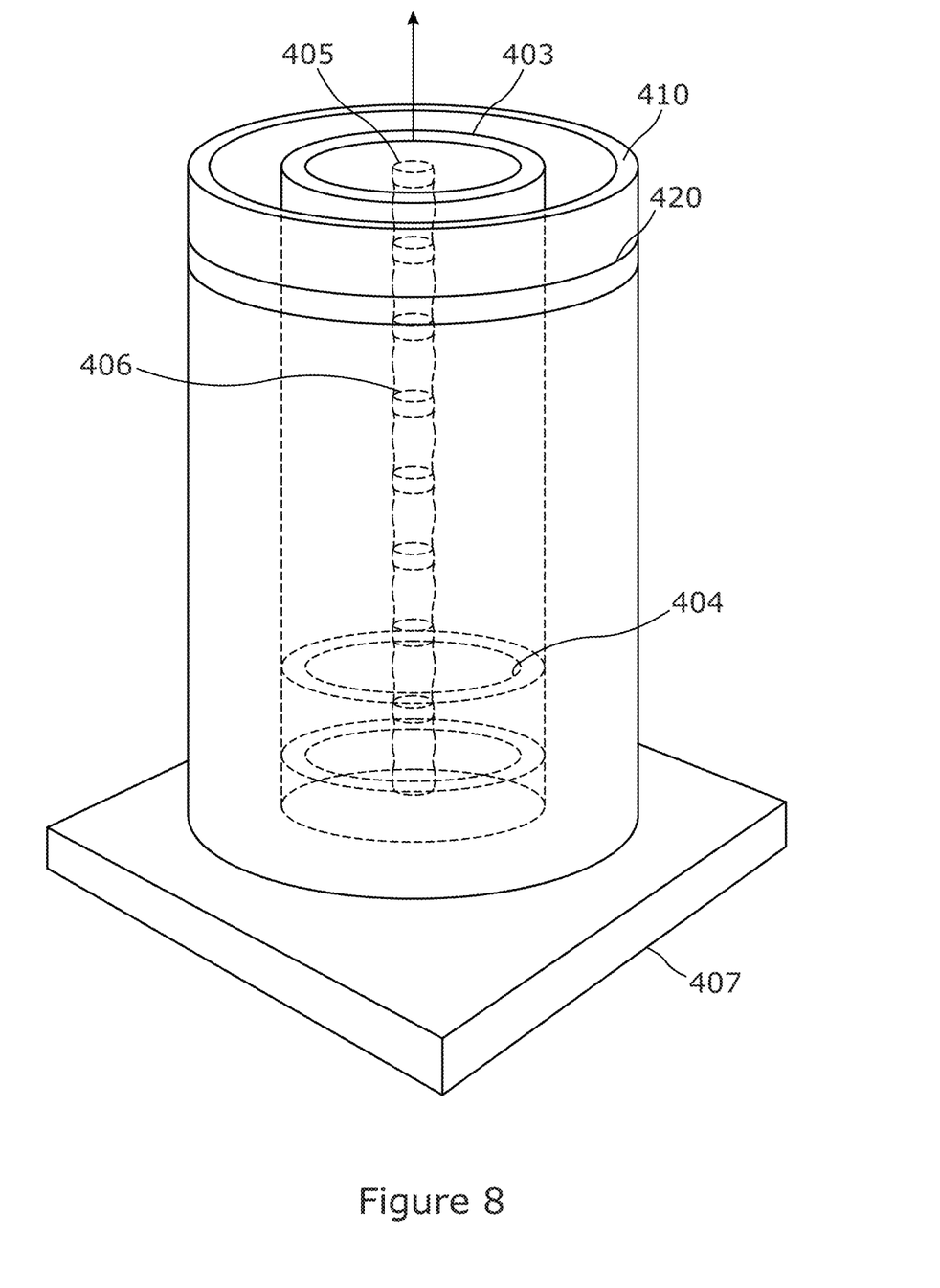
FIG. 8 is an isometric view showing an alternative fourth possible embodiment of a linear actuator shown in FIG. 2.

The skilled person will understand that many modifications are possible within the scope of the invention. In particular, whilst the three embodiments described above include magnets and pole pieces that all generally lie in one plane, the carriers for the magnets could be arranged so that the magnets do not all lie in the same plane. An example of such a design of linear actuator 400 is shown in cross section in FIG. 8 where the outer fixed portion 410 comprises a tube that has ring shaped teeth 420 spaced along its bore. The moving portion 403 comprising a smaller tube that fits within the outer fixed portion. The tube supports ring shaped ferrous pole pieces 404 spaced along its length. These are shown in dashed lines. A second fixed portion 405 comprises a rod that is located within the bore of the moving portion and carries the fixed magnets 406, also shown in dashed line. The two fixed portions are secured at one end to a base plate 407.

The skilled person will also understand that the term "linear" used throughout this document is intended to cover a translational, as distinct from a rotational, movement along a line of an output part and as such encompasses both linear movement along a straight line and curvi-linear movement along a curved line within the scope of the invention.

In accordance with the provisions of the patent statutes, the principle and mode of operation of this invention have been explained and illustrated in its preferred embodiments.

However, it must be understood that this invention may be practiced otherwise than as specifically explained and illustrated without departing from its spirit and scope.

What is claimed is:

1. A linear actuator comprising:
    a first fixed portion comprising a linear array of stator teeth, each surrounded by one or more turns of electrical wire,
    a controller which generates a set of currents that are applied to phase windings of the first fixed portion to generate a pattern of magnetic poles along the array of stator teeth, a spacing between the magnetic poles being larger than a spacing between adjacent stator teeth of the first fixed portion,
    a second fixed portion that comprises an alternating set of magnet poles, a spacing between adjacent poles being smaller than the spacing of the magnetic poles of the first fixed portion created by the controller, and
    a movable output portion that comprises a linear array of pole pieces that extend along a length of the moveable output portion that is greater than a stroke length of the actuator and longer than a length of the fixed portion, whereby in use a length of the movable output portion is at all times located between the first and second fixed portions, in which the pole pieces that are located between the first and second fixed portions shape a magnetic flux acting between the magnetic poles of the first fixed portion and the magnet poles of the second fixed portion, and
    whereby in use the controller is arranged to cause linear movement of the moveable output portion by moving the magnetic poles of the first fixed portion along the first array.

2. The linear actuator according to claim 1 in which the first fixed portion defines two magnetic poles, the second fixed portion defines more than two magnet poles, and the pole pieces shape the magnetic flux from the magnet poles of the second magnetic poles to generate two magnetic poles in the region where the flux from the first fixed portion meets the flux from the second fixed portion.

3. The linear actuator according to claim 1 in which the pole pieces of the moveable output portion comprise ferrous metallic pole pieces supported by a non-ferrous carrier.

4. The linear actuator according to claim 1 in which the movable output portion comprises an elongate member having a constant cross section along a major part of the length thereof.

5. The linear actuator according to claim 1 in which the second fixed portion comprises a linear array of permanent magnets, each permanent magnet defining one pole of the second fixed portion.

6. The linear actuator according to claim 1 in which the second fixed portion comprises a linear array of electromagnets.

7. The linear actuator according to claim 1 which further comprises
    a third fixed portion comprising a linear array of stator teeth, each surrounded by one or more turns of electrical wire,
    the controller generating a set of currents that are applied to phase windings of the third fixed portion to generate the same pattern of magnetic poles along the linear array of stator teeth for the third fixed portion as for the first fixed portion, and
    a second movable output portion that comprises a linear array of pole pieces, at least part of the second movable output portion being located between the second fixed portion and the third fixed portion.

8. The linear actuator according to claim 7 in which the number and position of the pole pieces of the second movable portion match the number and a position of the pole pieces of the first movable output portion and shape the magnetic flux acting between the poles of the third fixed portion and the poles of the third fixed portion.

9. The linear actuator according to claim 7 in which the first and second movable output portions are mechanically connected or formed from a single unitary member.

10. The linear actuator according to claim 7 in which all of the fixed portions and moveable portions lie in a single plane which each array being rectilinear.

11. A linear actuator for use with a controller to form a linear actuator assembly according to claim 1, the actuator comprising:
   a first fixed portion comprising a linear array of stator teeth, each surrounded by one or more turns of electrical wire,
   a second fixed portion that comprises an alternating set of magnet poles, and
   a movable output portion that comprises a linear array of pole pieces that extend along a length of the output part that is greater than the stroke length of the actuator and longer than the length of the fixed portions, whereby in use a length of the movable output portion is at all times located between the first and second fixed portions, in which the pole pieces that are located between the fixed portions shape the magnetic flux acting between the poles of the first fixed portion and the poles of the second fixed portion.

* * * * *